(12) United States Patent
Selsam (10) Patent No.: US 7,063,501 B2
(45) Date of Patent: Jun. 20, 2006

(54) MULTI-ROTOR WIND TURBINE WITH GENERATOR AS COUNTERWEIGHT

(76) Inventor: Douglas Spriggs Selsam, 2600 Porter Ave. Unit B, Fullerton, CA (US) 92833

( * ) Notice: Subject to any disclaimer, the term of this patent is extended or adjusted under 35 U.S.C. 154(b) by 116 days.

(21) Appl. No.: 10/810,375

(22) Filed: Mar. 27, 2004

(65) Prior Publication Data

US 2005/0214117 A1  Sep. 29, 2005

(51) Int. Cl.
*F03D 7/02* (2006.01)
(52) U.S. Cl. .................................... 415/4.3; 416/132 B
(58) Field of Classification Search ................ 415/4.1, 415/4.3, 4.5, 5, 908; 416/131, 132 B, 132 R, 416/134 R, 135, 139, 141, 144, 148, 198 R, 416/DIG. 4, DIG. 6; 290/44, 55
See application file for complete search history.

(56) References Cited

U.S. PATENT DOCUMENTS 4,065,225 A * 12/1977 Allison ........................ 416/121
4,213,057 A *  7/1980 Are ............................... 290/44
4,242,043 A * 12/1980 Poulsen ........................ 416/11

* cited by examiner

*Primary Examiner*—Edward K. Look
*Assistant Examiner*—Dwayne J White (57) ABSTRACT

A multiplicity of horizontal axis rotors are coaxially attached, at spaced intervals, to an elongate driveshaft. This driveshaft with attached rotors is aimed, not directly into the wind, but at a slightly offset angle, allowing each rotor to encounter a wind stream having fresh wind. That offset angle may be in the vertical plane, horizontal plane, or oblique. The shaft is held with rotational freedom at or near its midsection by a cantilevered bearing means, and drives a load, such as an electrical generator. This cantilevered bearing means, along with the rotor laden driveshaft which it supports, is allowed to pivot, as an entire unit, about the vertical axis of a supporting tower. The generator, brake, support frame, as well as a dedicated counterweight can also serve as a counterweight to help elevate the downwind section of the driveshaft, by pushing downward on the upwind section of the turbine.

20 Claims, 10 Drawing Sheets

MULTI-ROTOR WIND TURBINE WITH GENERATOR AS COUNTERWEIGHT (This patent application is related to U.S. Pat. Nos. 6,616,402 and 6,692,230 issued to this inventor, and U.S. patent application Ser. No. 10/781213 by this inventor)

BACKGROUND

This invention relates to wind turbines.

1. Prior Art

In U.S. Pat. No. 6,616,402 I introduce a downwind-projecting, co-axial, multi-rotor, wind turbine that orients the driveshaft at an offset angle from the wind direction, allowing fresh wind to each rotor. The advantages include lighter total rotor weight for the swept area, and higher rpm for a given power rating. Shaft rotation at higher rpm delivers a given amount of power at less torque, and requires a smaller generator, and/or less gearing for the same power output.

In U.S. Pat. No. 6,692,230 I introduce a balanced version of the co-axial, multi-rotor wind turbine, having an upwind section of the driveshaft that serves to some degree as a counterbalance to the downwind section of the driveshaft. This upwind section, like the downwind section, has rotors attached at spaced intervals, adding power to the system. In the second embodiment of this U.S. Pat. No. 6,692,230 illustrated in FIGS. 9 and 10 of that patent, a counterweight attached to the upwind section of the driveshaft serves to counterbalance against a much longer downwind section of the driveshaft. The extra length of the downwind section allows the attachment of additional rotors, providing even more power.

BRIEF SUMMARY OF THE INVENTION

The present invention uses the generator itself as a counterweight, to counterbalance the downwind section of the driveshaft and its attached rotors. This is accomplished by mounting the generator forward of a pivot point. Other heavy components, such as a disc brake, and a supporting frame, can also be advantageously placed as far forward, or upwind, as possible in relation to a pivot, to provide a ballast effect to push down on the upwind, or forward section of the driveshaft. Pushing down on the upwind section helps to lift the downwind section of the driveshaft, like a teeter-totter. Additional weight can be added. The weight of the generator, components such as a brake, and any additional weights mounted upwind of a pivot point, help to balance against the weight of an extended downwind section of the driveshaft. A longer downwind section of the driveshaft can support more rotors, producing more power.

This counterweight effect may be accomplished in several ways:

The generator and other heavy components may be mounted toward the forward end of a teetering central frame that also supports the driveshaft.

The central support frame itself can be mounted largely forward of a pivot point Alternatively, the generator may be mounted to, and supported by the upwind section of the driveshaft itself. In this case the generator may be located near some midpoint of the front driveshaft, or may be located at or near the upwind, forward end of the front driveshaft.

A spring or other lifting means, such as a lifting body may also be used to augment the forces that serve to elevate the downwind section of the driveshaft. A damping means such as a shock absorber may be applied to regulate the movement of the driveshaft.

Figure 4:
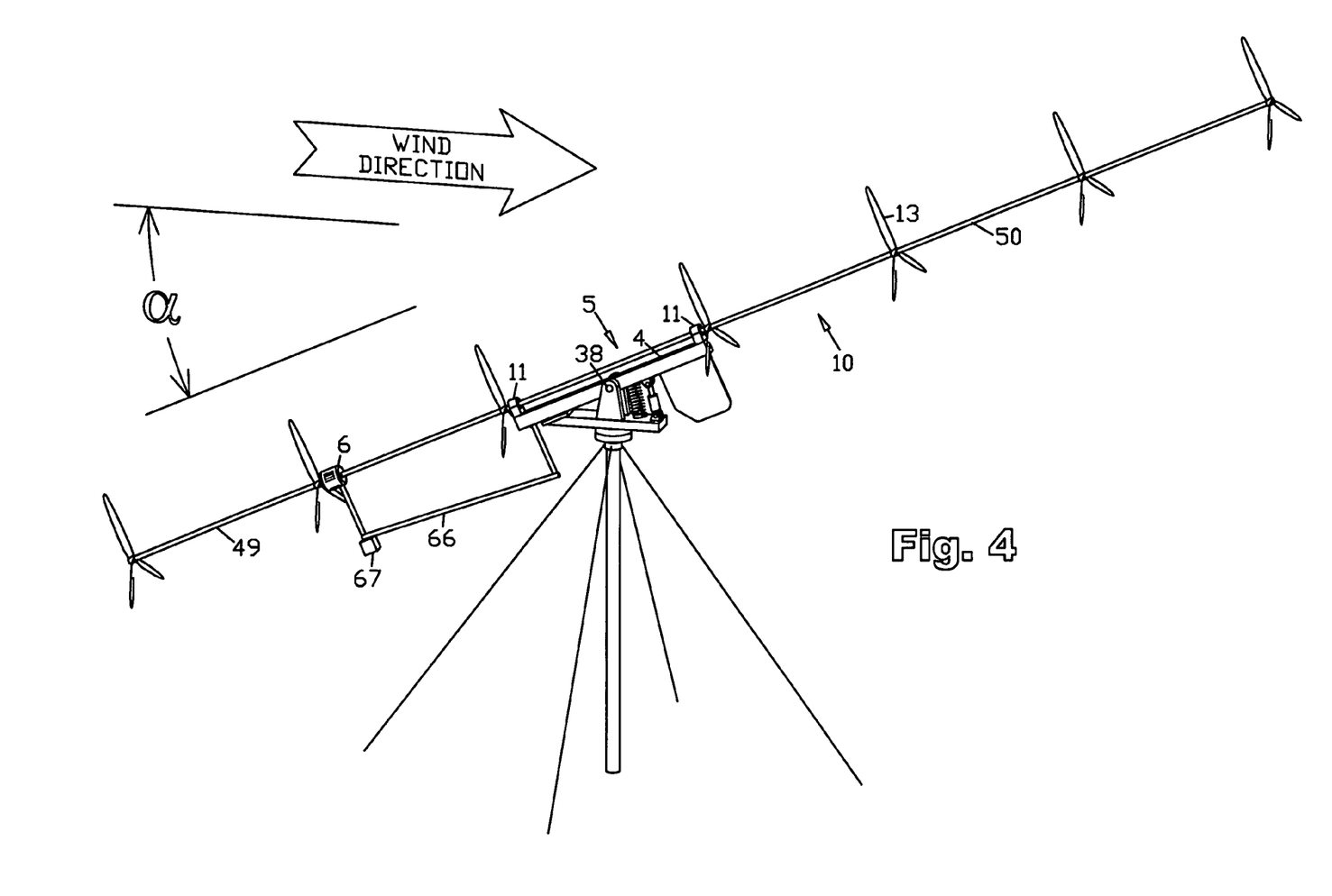
FIG. 4 shows the fourth embodiment.

PART NUMBERS IN THE DRAWING FIGURES 4 bearing support means (central support frame)
5 cantilevered bearing means
6 load
10 elongate driveshaft
11 bearing
13 horizontal axis type rotor
15 axle
27 resilient spring means
31 lifting body
34 damping means (shock absorber)
35 yaw bearing
36 elevation angle control means
37 lifting mechanism
38 pivot means
49 upwind section of the driveshaft
50 downwind section of the driveshaft
55 guy wire
66 continuous power conduit means (electric cable)
67 ballast counterweight means
81 brake
90 tower means
122 tail
170 truss structure
172 boom
174 secondary boom
176 guy wire to lift downwind section
α offset angle from wind direction, (becomes simply the elevation angle if the angular offset is solely from the horizontal)

DETAILED DESCRIPTION OF THE INVENTION

1. First Embodiment

Figure 1:
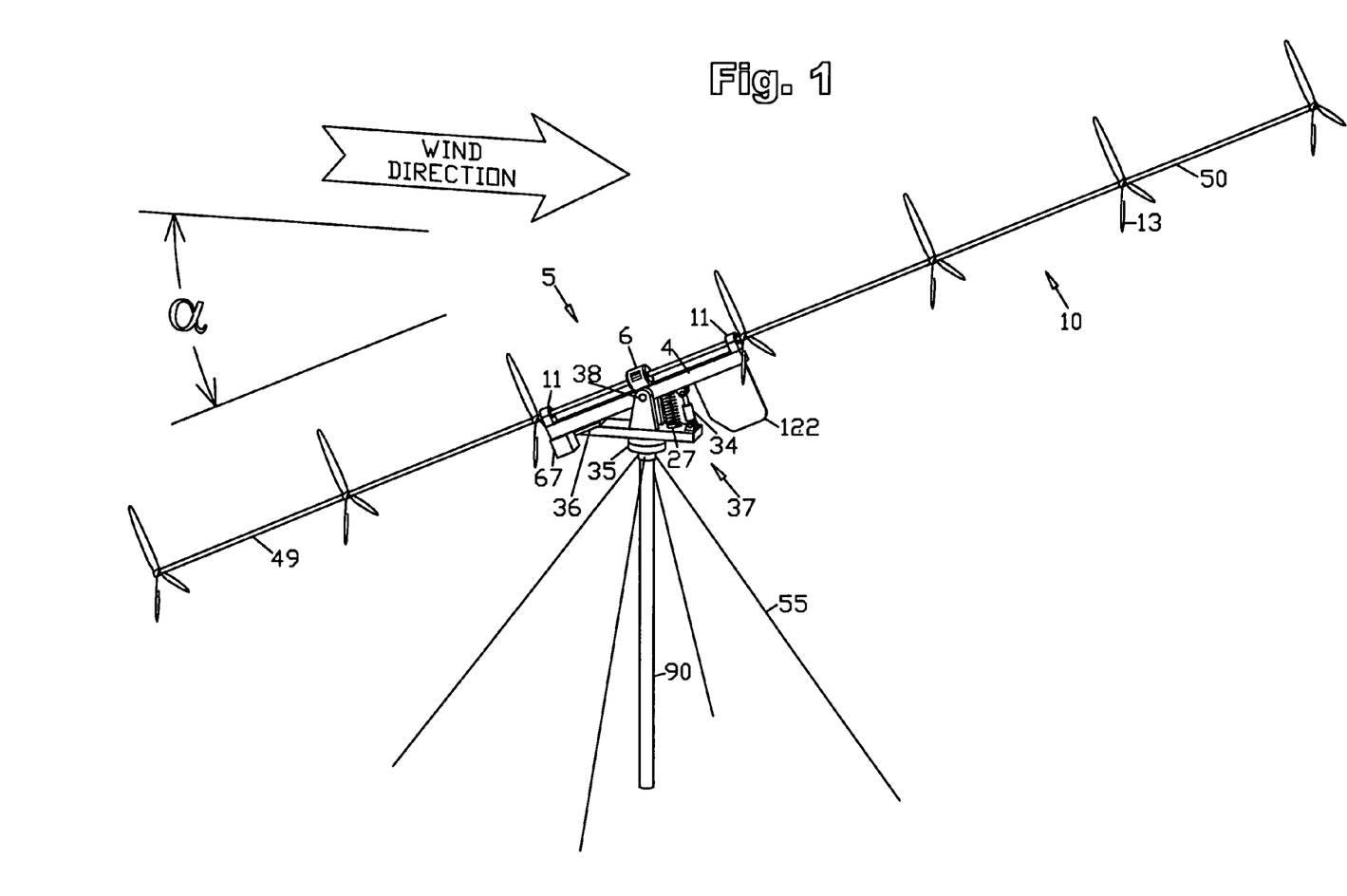
FIG. 1 shows the first embodiment.

FIG. 1: A co-axial, multi-rotor wind turbine, with the axis of rotation offset from the wind direction by angle α (alpha), in this case the offset angle α is in the vertical plane. A multiplicity of horizontal axis type rotors 13 are attached at spaced intervals to the upwind section 49, and the downwind section 50 of the driveshaft 10. The offset angle a combined with the spacing between rotors 13 allows fresh wind to each rotor, as explained in U.S. Pat. No. 6,692,230 issued to this inventor. The downwind section 50 of the driveshaft 10 is longer than the upwind section 49 and has more attached rotors 13. The tail 122, along with the higher number of rotors and extra length of the downwind section 50 help to keep the turbine headed into the wind, by presenting more total wind resistance than the upwind section, in relation to yaw bearing 35, about which the entire turbine pivots directionally. A cantilevered bearing means 5 comprises bearings 11, a rigid axle 15 which is part of driveshaft 10, and a bearing support means that is in this case a central support frame 4. Central support frame 4 has a counterweight 67 at the front. Load 6, which is in this case a generator, is at the center. More rotors 13 are mounted to the downwind section 50 of the driveshaft 10 than to the upwind section 49. The combined extra rotor weight on the downwind section of the driveshaft, and the extra weight of the additional length of the downwind section itself, as well as the extra leverage afforded by the extra length of this downwind section, are counterbalanced about pivot 38 by counterweight 67, located forward, or upwind, of pivot 38. Counterweight 67 exerts a downward force on the forward, or upwind part of the turbine, which translates to an upward force lifting the downwind section of the driveshaft. This upward force helps to elevate the downwind section 50, allowing it to be longer, and to support more rotors 13, which results in more power output from the turbine, as more rotors 13 capture more power. Also shown is a lifting mechanism 37 comprising a spring 27 that is disposed to help lift the downwind section 50 of the driveshaft 10, and a damping means 34 that is illustrated as a simple shock absorber, that helps to regulate and slow the tilting movement fore and aft. The elevation angle control means 36 comprises in this case a rest 180 that determines the offset angle $\alpha$ of the driveshaft in the normal operating position. The geometry and forces are so chosen so that in excessively strong winds the turbine is allowed to be blown into a horizontal position, placing the driveshaft parallel to the wind, so that offset angle $\alpha$ is equal to zero and all rotors are directly in line with the wind, and with each other. This arrangement places all rotors except the first within the wake of upwind rotors, reducing total power output for protection from overspeed. This change in offset angle $\alpha$ may be abrupt, taking place at a certain wind speed, or may be progressive and gradual over a range of wind speeds. The effect is to flatten the upper end of the power curve.

2. Second Embodiment

Figure 2:
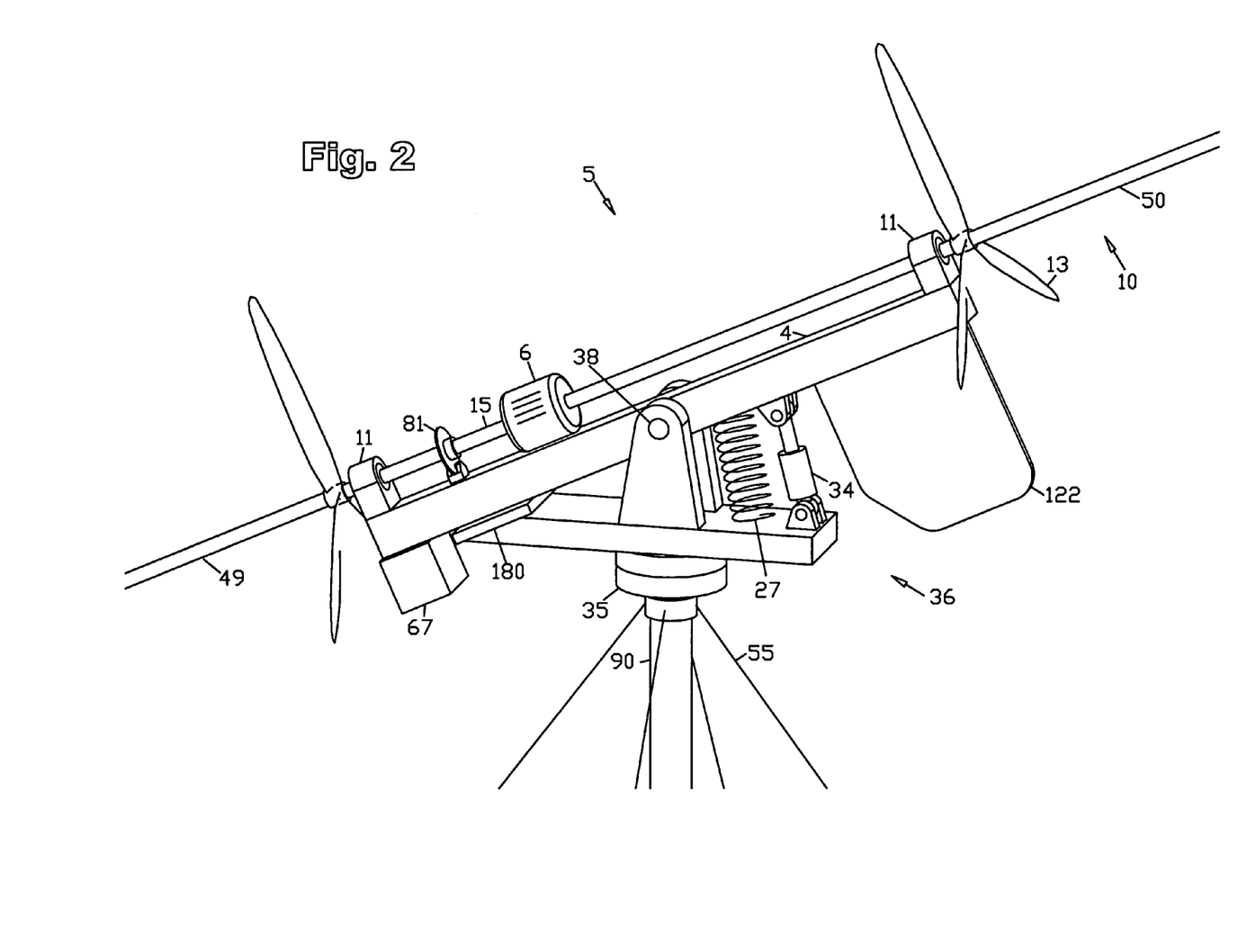
FIG. 2 shows the second embodiment.

FIG. 2: Same as first embodiment except load 6, a generator, is located forward of pivot 38, about ⅓ of the way from the front, and a brake 81 is also located upwind of pivot 38. Thus the weight of the generator itself, and the weight of the brake, also act as counterweights, pushing down on the forward (upwind) part of the turbine, so as to lift the downwind section 50 of the driveshaft and its attached rotors 13. Note that since the generator is still located between the bearings 11, the upwind section 49 of the driveshaft 10 may be supported in a projecting, cantilevered manner from the forward bearing and the generator, as the generator itself may be part of the cantilevered bearing means 5.

3. Third Embodiment

Figure 3:
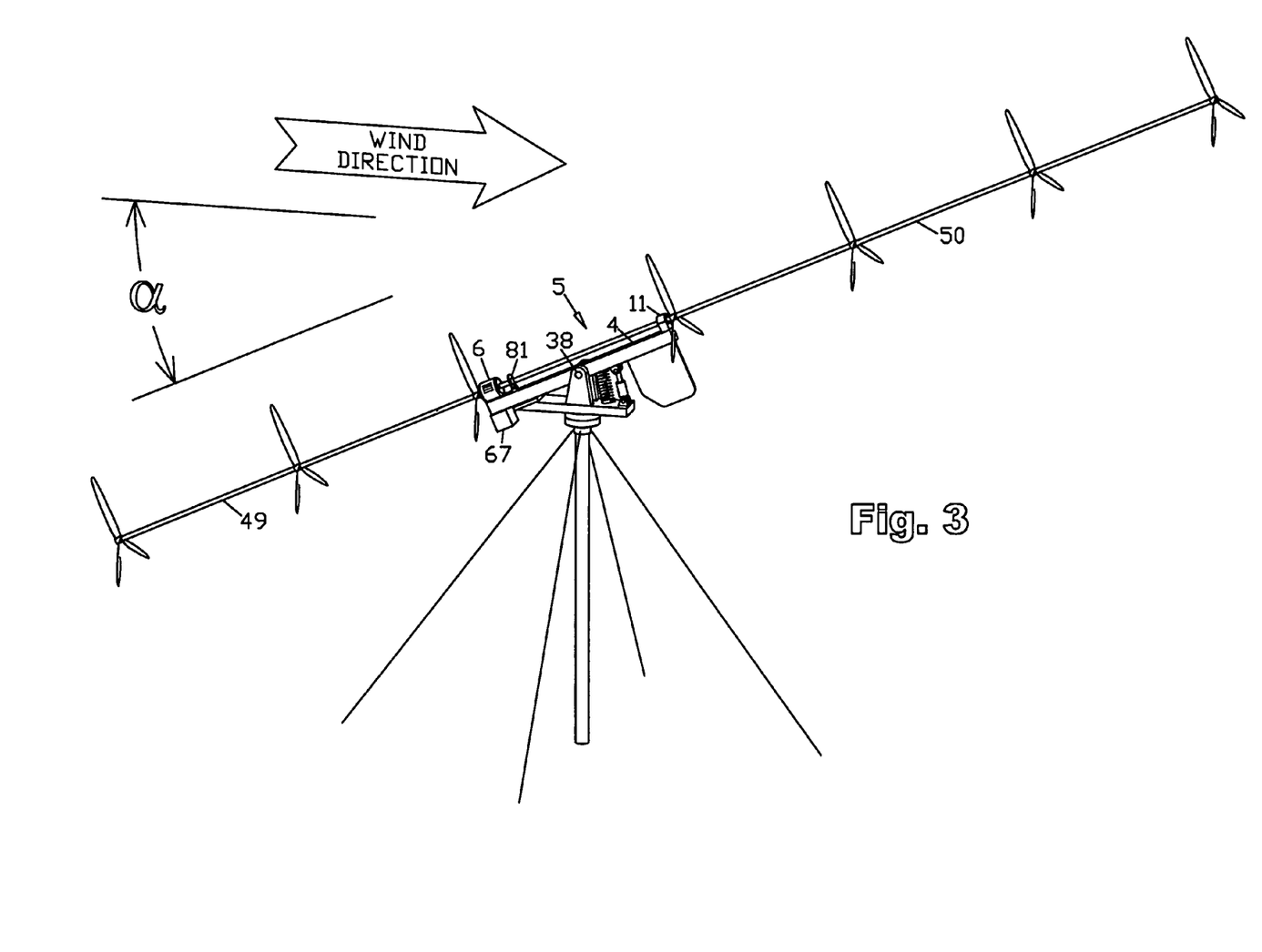
FIG. 3 shows the third embodiment.

FIG. 3: The third embodiment is the same as the second embodiment, except that here the load 6 (generator) is located at the front of the central support frame. The generator 6 itself serves as the front bearing. So in this case the generator has 3 jobs: it is acting as a generator, as a counterweight, and as a bearing. More specifically, the at least one bearing of the generator serves as the upwind main bearing 11 of cantilevered bearing means 5 that support the driveshaft 10. In this case the generator becomes a part of cantilevered bearing means 5.

4. Fourth Embodiment

FIG. 4: The fourth embodiment is the same as the first embodiment, except that in this fourth embodiment the generator 6 is actually supported by the upwind section of the driveshaft itself, being located just downwind of the second rotor. This gives the generator 6 more leverage about pivot 38 to better serve as a counterweight. A ballast counterweight 67 helps further in this regard, as before and in this case counterweight 67 is attached to the generator and also serves as a means for the stator of the generator to resist rotation. Power is channeled along the continuous power conduit means 66 (in this case an electric cable). As before, we may optionally include a spring 27 to help lift the rear of the support frame, and shock absorber 34 to damp movement.

5. Fifth Embodiment

Figure 5:
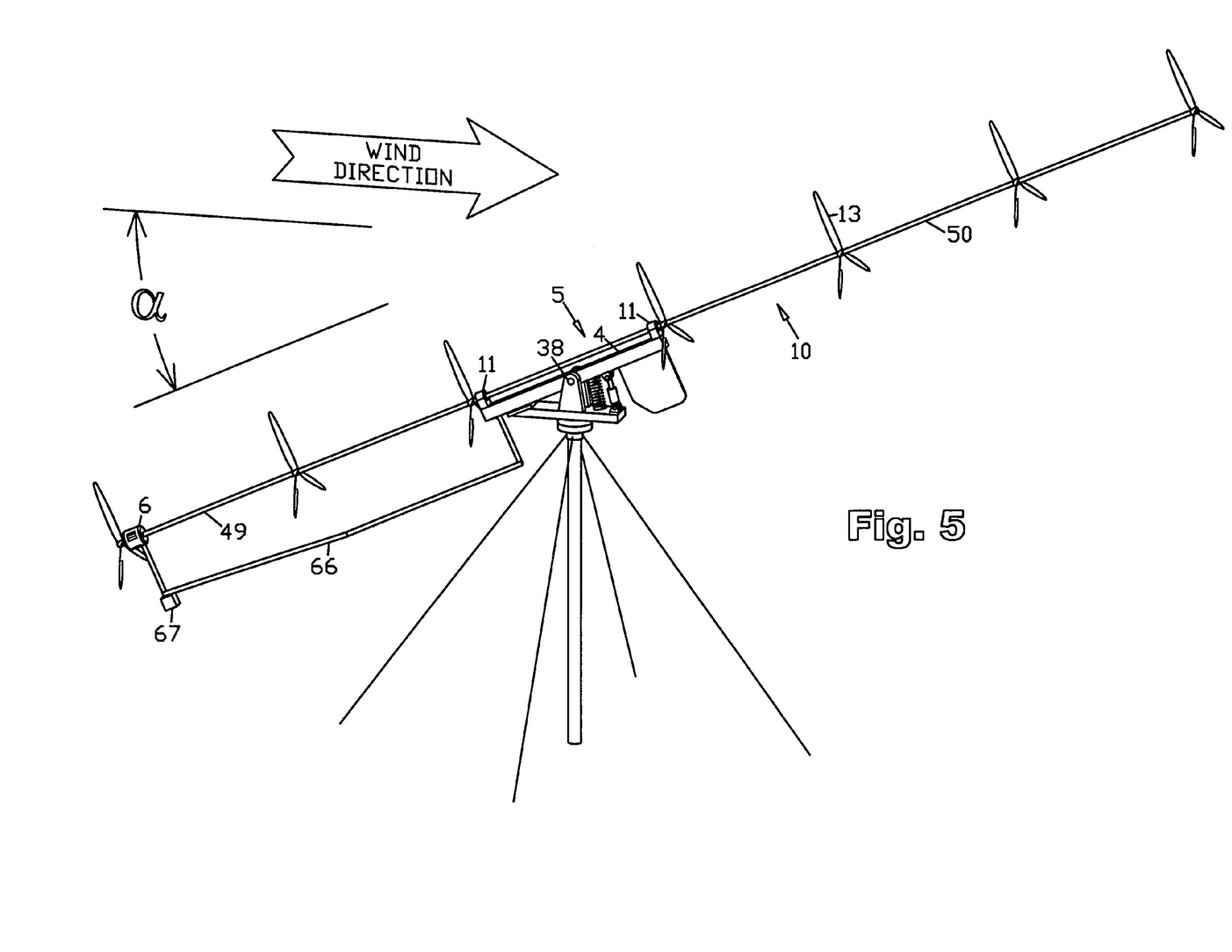
FIG. 5 shows the fifth embodiment.

FIG. 5: This fifth embodiment is similar to the fourth embodiment except that in the fifth embodiment the load 6 (generator) and counterweight 67 are located at the far upwind end of the upwind section 49 of the driveshaft 10, just behind the first (upwind) rotor. This far upwind placement enhances the counterweight behavior of the generator and counterweight by increasing the length of their lever arm in relation to the pivot 38. The part of the driveshaft that goes through the generator can be of a smaller diameter, since it supports only a single rotor close to the generator.

6. Sixth Embodiment

Figure 6:
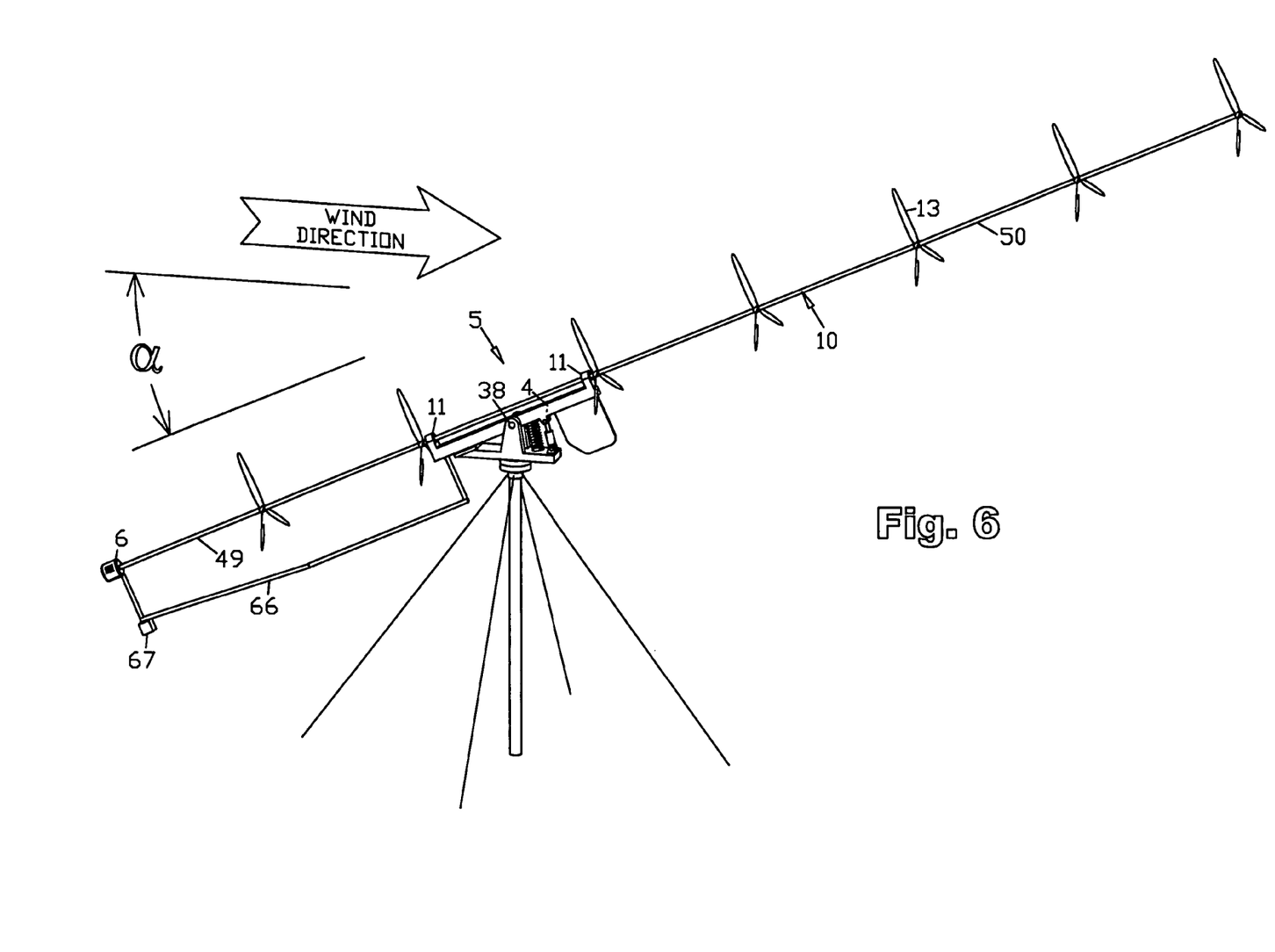
FIG. 6 shows the sixth embodiment.

FIG. 6: The sixth embodiment is similar to the fifth embodiment except that here in the sixth embodiment, the load 6 (generator) is located at the far upwind end of the driveshaft, with all rotors 13 downwind of the generator 6.

7. Seventhth Embodiment

Figure 7:
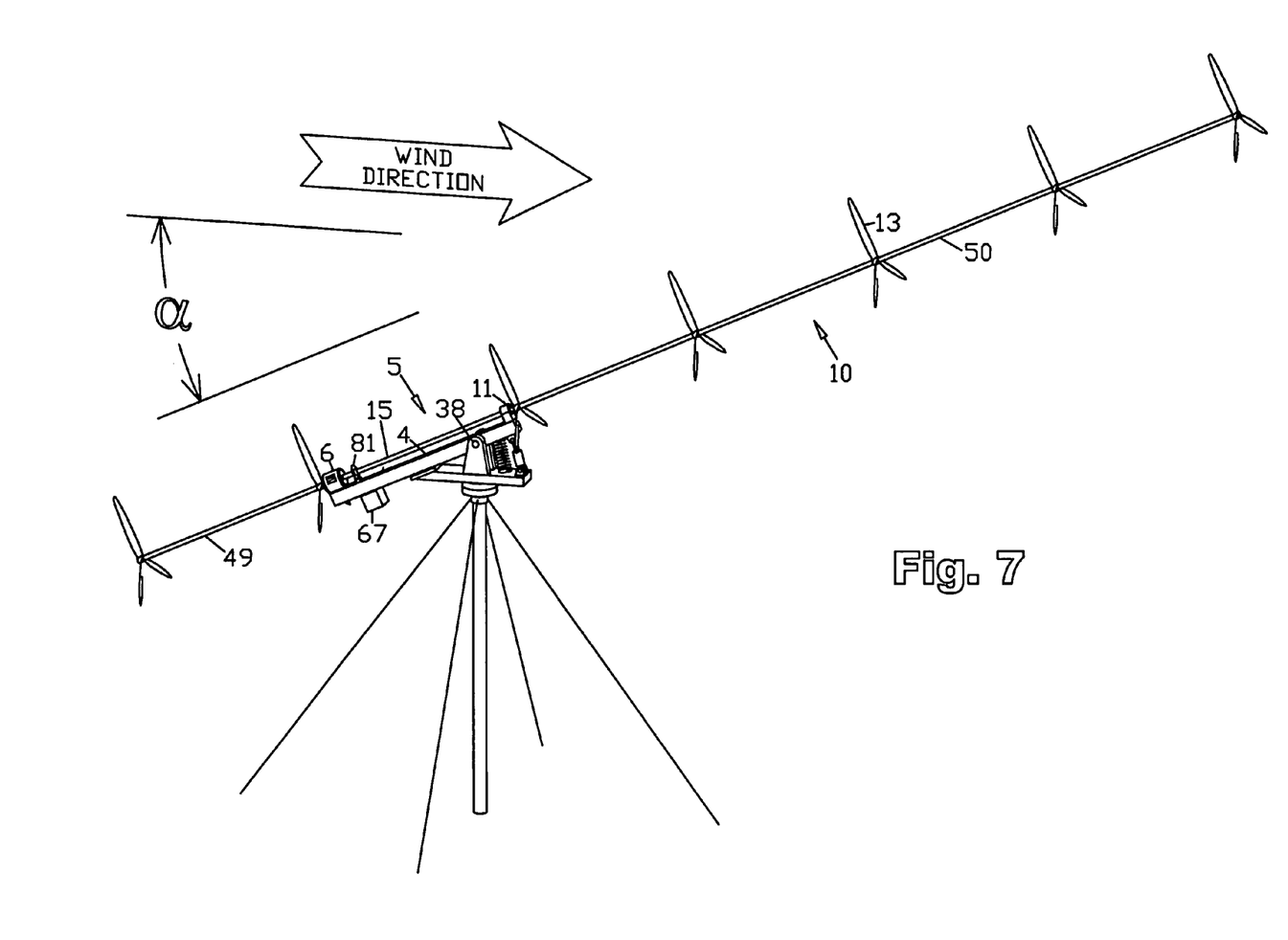
FIG. 7 shows the seventh embodiment.
Figure 8:
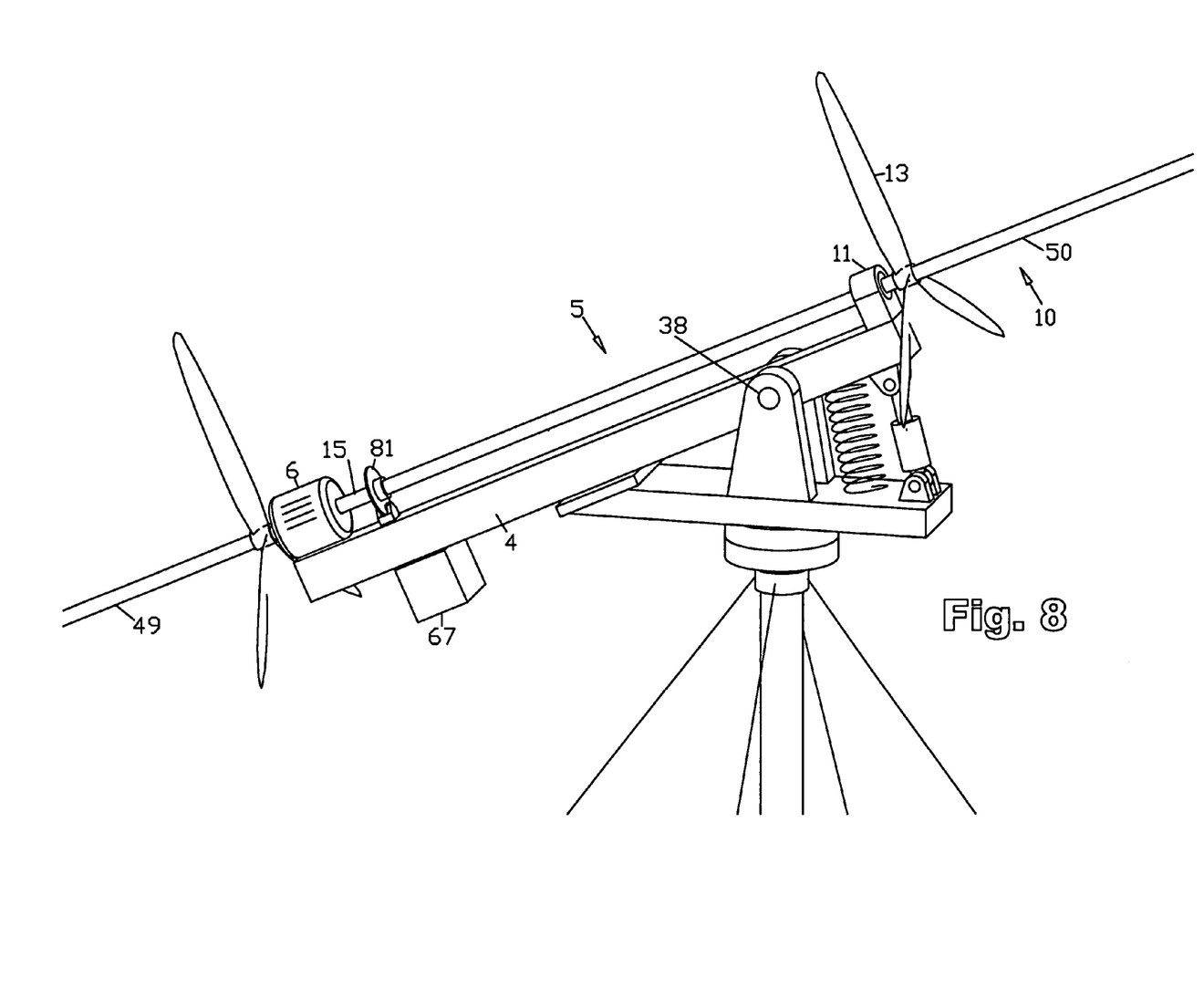
FIG. 8 shows a close-up view of the seventh embodiment.

FIGS. 7 and 8: The seventh embodiment is similar to the third embodiment, with the generator 6 located at the upwind end of the support frame 4, doing triple duty by serving as the generator and also as both the upwind bearing, and as a counterweight. In this embodiment, the support frame 4 itself is located mostly upwind of pivot 38, so that this support frame 4 itself is also acting as a counterweight. This allows an even longer downwind section 50 of driveshaft 10, with more rotors. FIGS. 7 and 8 show that there is no dedicated tail 122, as the extra length of downwind section 50 of driveshaft 10, and the extra rotors 13 attached to the downwind section 50 provide enough wind resistance to keep the turbine directionally headed into the wind without the need for a dedicated tail. Brake 81 and counterweight 67 may optionally be included to also counterbalance against the extended downwind section 50 and its attached rotors. Resilient spring means 27 and damping means (shock absorber) 34 may alternatively be reconfigured to be properly located forward of pivot 34, allowing support frame 4 to be located even further upwind, (not illustrated) for extra leverage. The resilient spring means 27 could in that case pull downward on the support frame 4 at a point upwind (forward) of the pivot 38, which in effect pulls downward on the entire upwind section 49 of the driveshaft, to help raise the downwind section 50 of the driveshaft. This embodiment seeks to place as much of the apparatus as possible upwind of the pivot, so that as long a downwind section 50 of the driveshaft as possible can be counterbalanced thereby.

8. Eighth Embodiment

Figure 9:
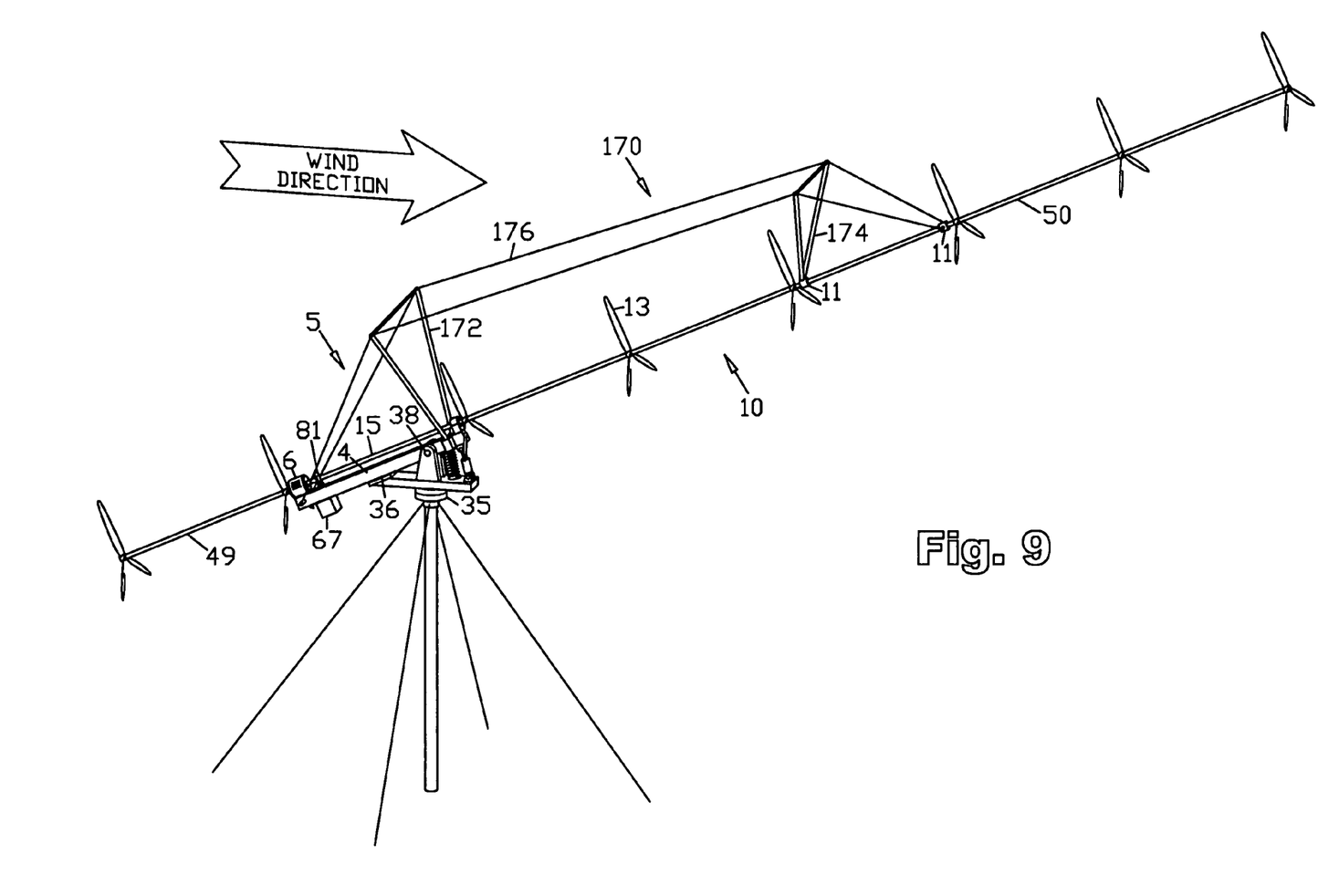
FIG. 9 shows the eighth embodiment.

FIG. 9: The eight embodiment is similar to the seventh embodiment, with the addition of one or more guy wires 176 to help stabilize the downwind section 50 of driveshaft 10. In this case the guy wires 176 serve to lift this downwind section, in the manner of a crane or truss, so that it does not sag. The attachment point of the guy wires to the downwind section 50 of driveshaft 10 comprises at least one bearing 11 to allow free rotation of the driveshaft. The two guy wires shown will also have the effect of laterally stabilizing the structure. Many generally equivalent structures are possible, within the scope of this invention. In general the guy wires may serve to transmit the counterweight forces upwind of pivot 38 to the downwind section 50 of the driveshaft 10 to help lift it. Alternatively the guy wires may simply transfer the weight of the downwind section 50 and its attached rotors to the support frame 4. The optional inclusion of at least one boom 172 attached to the support frame 4, and optional inclusion of at least one secondary boom 174 may be utilized to form, along with the guy wires and the driveshaft itself, a sort of truss structure 170, which can resist bending better than the driveshaft alone, and thereby allow for a longer downwind section 50 of the driveshaft 10, which can reach higher into the sky, with more rotors, to capture more wind, and produce more power.

9. Ninth Embodiment

Figure 10:
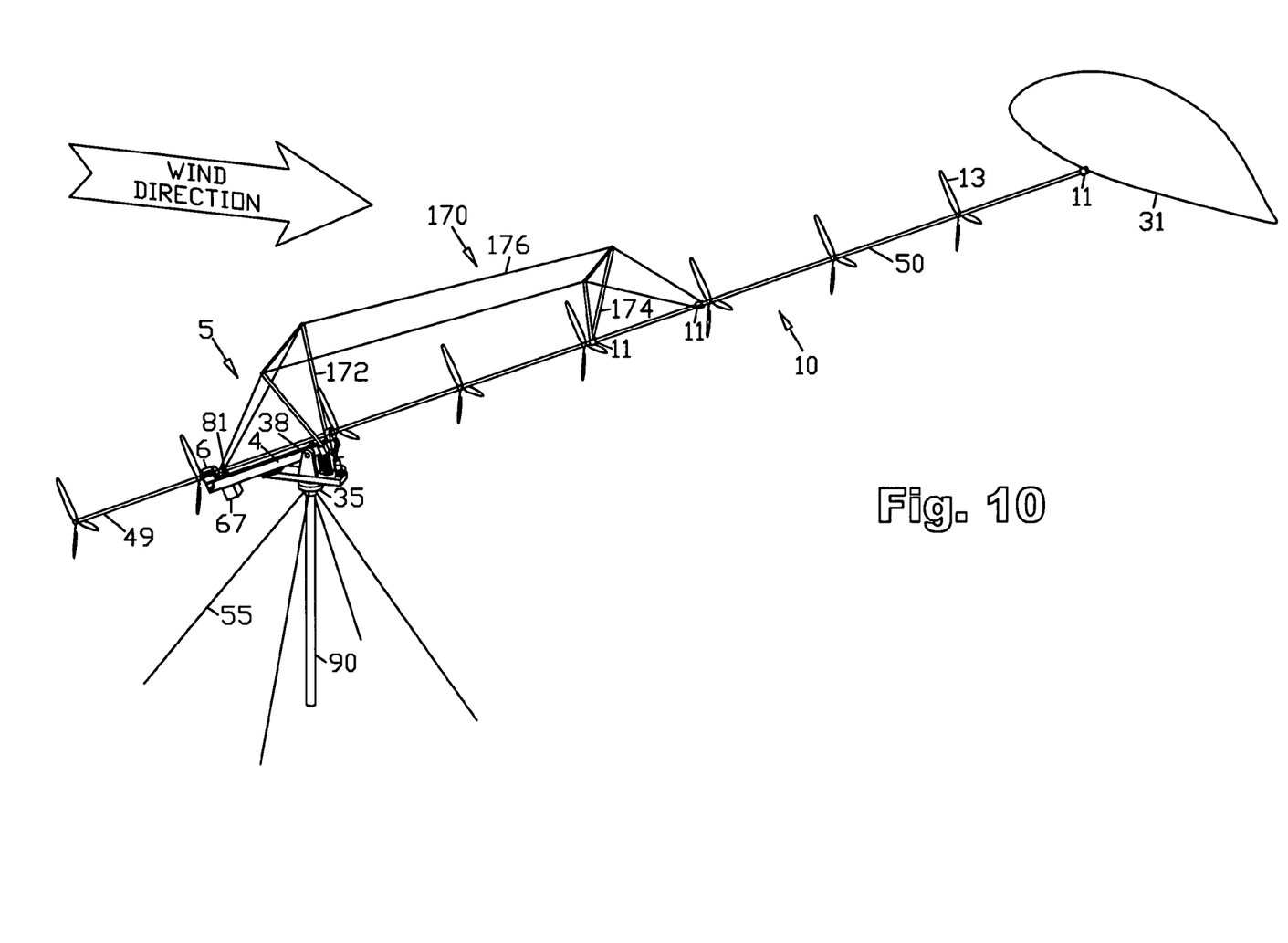
FIG. 10 shows the ninth embodiment.

FIG. 10 This ninth embodiment is similar to the eighth embodiment, with the addition of at least one lifting body 31 attached to the downwind section 50 of driveshaft 10 the help elevate it. Such a lifting body may have aerodynamic lift, buoyant lift, or both. Buoyant lift may be obtained through the use of a buoyant gas, such as helium or hydrogen. The buoyant gas may be used to fill the lifting body. At least one bearing 11 attaching said driveshaft to said lifting body allows the driveshaft to rotate relative to the lifting body.

10. Tenth Embodiment

If the driveshaft is hollow, a buoyant gas may be used to fill the driveshaft itself, making the driveshaft itself, or a part of the driveshaft itself, atmospherically buoyant.

What is claimed is:

1. A co-axial, multi-rotor wind turbine having:
   a bearing;
   a driveshaft, supported by said bearing;
   a downwind projecting section of said driveshaft having rotors attached at spaced intervals;
   a load;
   a pivot point;
   wherein said load is located forward of said pivot point, so that said load acts as a counterweight, serving to at least partially counterbalance said downwind projecting section of said driveshaft and said attached rotors, about said pivot point.

2. The wind turbine of claim 1 further having an upwind projecting section of said driveshaft.

3. The wind turbine of claim 2 wherein said upwind projecting section of said driveshaft has at least one rotor attached to it.

4. The wind turbine of claim 3 wherein said at least one rotor comprises rotors attached at spaced intervals to said upwind section of said driveshaft.

5. The wind turbine of claim 1, further comprising a bearing support means, wherein said load is supported by said bearing support means.

6. The wind turbine of claim 1, further comprising a brake located upwind of said pivot point, wherein said brake acts as a counterweight, serving to help elevate said downwind section of said driveshaft.

7. The wind turbine of claim 2 wherein said load is supported by said upwind section of said driveshaft.

8. The wind turbine of claim 1, further comprising a dedicated counterweight located upwind of said pivot point, wherein said counterweight serves to help elevate said downwind section of said driveshaft.

9. A co-axial, multi-rotor wind turbine having a counterweight forward of a pivot point, at least part of said counterweight not co-rotating with said turbine, said counterweight serving to at least partially counterbalance a downwind section of a driveshaft and its attached rotors.

10. The wind turbine of claim 9 wherein said counterweight comprises a load.

11. The wind turbine of claim 9, further locating a brake forward of a pivot point, so that said brake can serve as an additional counterweight.

12. The wind turbine of claim 9, further locating a support frame substantially forward of a pivot point, so that said support frame can serve as an additional counterweight.

13. The wind turbine of claim 9, further locating a dedicated counterweight forward of a pivot point, so that said dedicated counterweight can serve as an additional counterweight.

14. The wind turbine of claim 9, further comprising a guy wire that serves to help elevate the downwind section of the driveshaft.

15. The wind turbine of claim 13, further comprising a boom to help support said guy wire in an effective position.

16. The wind turbine of claim 9, further comprising a truss structure that serves to help elevate the downwind section of said driveshaft.

17. The wind turbine of claim 9, further comprising a lifting body that serves to help elevate the downwind section of said driveshaft.

18. The wind turbine of claim 17, wherein said lifting body functions by means of aerodynamic lift.

19. The wind turbine of claim 17, wherein said lifting body functions by means of buoyant lift, through the use of a buoyant gas.

20. A coaxial, multirotor wind turbine having a downwind section of a driveshaft, wherein massive nonrotating components of said wind turbine are located upwind of a structural attachment point, said massive components serving to counterbalance said downwind section of said driveshaft about said structural attachment point.

* * * * *